Oct. 17, 1939.   H. L. ROSSELLE   2,176,803
FISHING LURE
Filed July 26, 1938
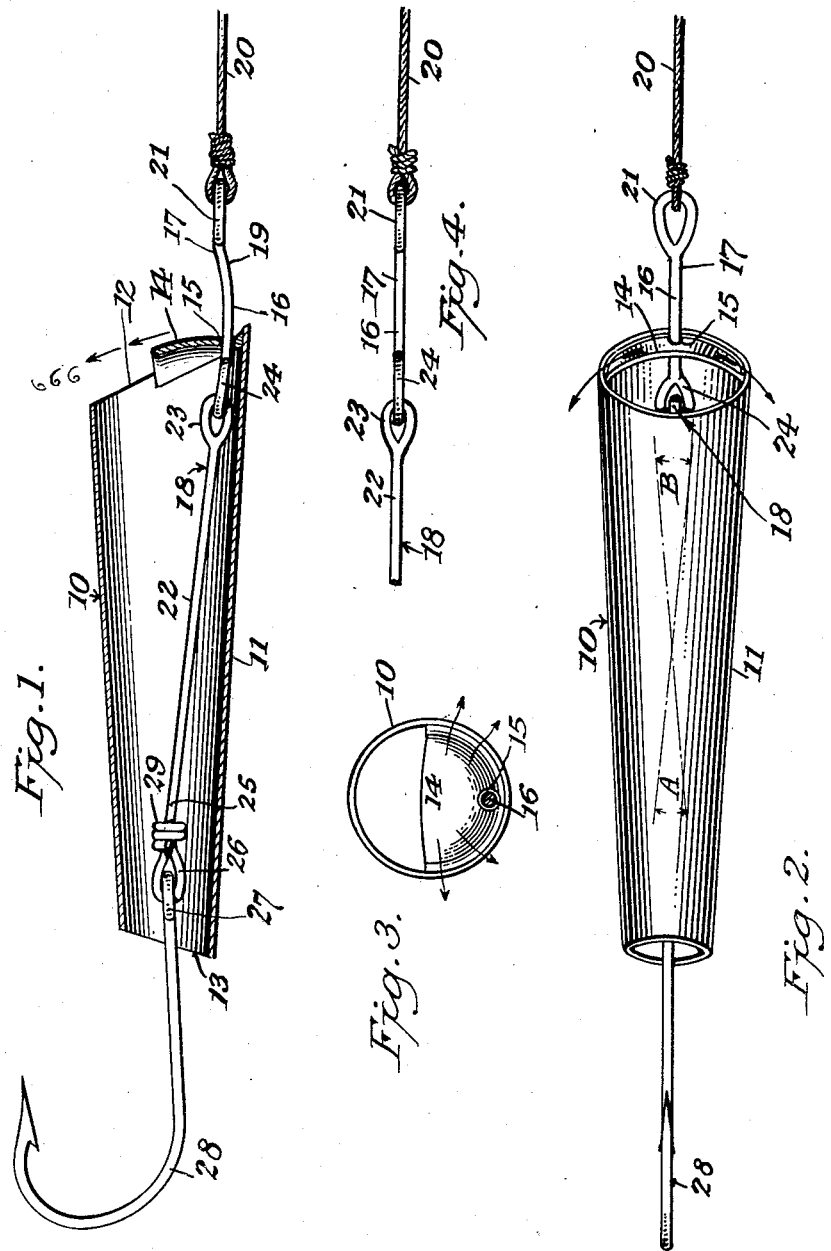
INVENTOR
Hiram L. Rosselle,
BY
Frank S. Appleman
ATTORNEY Patented Oct. 17, 1939

2,176,803

UNITED STATES PATENT OFFICE 2,176,803

FISHING LURE

Hiram L. Rosselle, Miami, Fla.

Application July 26, 1938, Serial No. 221,414

3 Claims. (Cl. 43—42)

This invention relates to an improved fishing lure, more particularly to a lure of the above class having inventive characteristics in construction, for the successful pursuit of game fish which, as a rule, strike only at live bait for food.

An object of the invention is to provide a lure for simulating the swimming action of a live bait-fish when trolling the lure at high speed through the water.

Another object of the invention is to protect the usually expensive fishing lines attached to the lure from extreme twisting in either direction and for easing the tension on the fishing line when under heavy loads or shocks caused by large fish striking the hook or hooks.

Features of the invention reside in the provision of a tubular lure tapered backwardly from its forward end or mouth to its rear end or tail, the ends being oppositely beveled outwardly and downwardly. The mouth of the lure is about half closed by a semi-spherically curved baffle plate formed into a forward convex curve vertically to about, or more than, half of the diameter of the mouth and spanning transversely or horizontally in a forwardly projective curve, the full diameter of said mouth. This construction acts to spread the water in thin sheets or films both upwardly and transversely of the head to cause an agitation or churning of the water there to present an illusion of rocking or wiggling of the lure and to increase the animating effect.

The structural features include a tubular tapered body, a forwardly curved deflector plate fixed in the larger or forward end of the body, a tandem chain comprising a curved forward link passing through an orifice in the deflector plate and formed at either end with a loop; to the forward loop a fishing line is attached and to the rear loop a second link is attached by a double loop construction having the quality of yielding under heavy strains or pulls for relieving the fishing line when a heavy fish strikes a hook linked to the rear end of the second chain-link which is located within the body of the lure.

In order that the invention may be more clearly understood and readily carried into effect, it will now be described in detail with reference to the drawing, in which like reference characters are employed to designate similar parts in the several views.

In the drawing:

Figure 1 illustrates a longitudinal sectional elevation of the improved lure;

Figure 2 illustrates a top view of the device;

Figure 3 illustrates a front view of the lure; and

Figure 4 illustrates a slightly modified form of forward chain-link in which there is no curve.

The construction may be described as follows:

The numeral 10 designates the body of the lure which may be tubular in form and tapered from front to rear as at 11. It is preferably constructed of a metal such as brass which can be highly polished or colored in any manner for luring the different game fish sought.

The ends of the lure are beveled as at 12 and 13, which shape tends to slightly animate the body 10 of the lure when trolled at high speed through the water.

The forward end of the body 10 is about half closed by a forwardly curved projective baffle plate 14, for spreading the water into lateral sheets, films or jets for forming an illusionary head or agitation to further animate the lure as the action of the water against the plate serves to wiggle the lure horizontally as indicated by the diagram A—B of Fig. 2.

The baffle plate 14 is formed with an orifice 15, through which the shank 16 of the leader link 17 of a draft-chain 18 may operate. The shank 16 of the leader link 17 may be longitudinally curved as shown at 19 to compensate for heavy loads, to protect the fishing line 20, made fast to a forward loop 21 of the link 17, against rupture.

A follower link 22, located within the body 10 of the lure is connected through loops 23 and 24, respectively, with the leader link 17. This loop connection is also slightly yielding to ease the drag on the fishing line 20.

The rear end 25 of the follower link 22 is formed into a loop 26 engaging a loop 27 on the shank of a fish hook 28, as in Fig. 1, the extreme end of the link being coiled around its own shank, as at 29, to permit replacement of hooks, as will be obvious.

The loops 23 and 24 in the chain may be closed by welding or not, as desired, and the loop 26 of the link 22 may be similarly closed.

The approximate lines of deflection of water sheets, films or sprays are indicated by arrows in Figs. 1 and 2.

I claim:

1. A fishing lure comprising a tube having a mouth and a tail portion, a forwardly curved plate for closing the lower part of the mouth, a draft chain extending through said plate, means for attaching a fish line to the forward link of said chain, and means for attaching a fish hook to the rear link thereof.

2. A fishing lure comprising a metallic shell tapered from its open mouth to its open tail, a plate formed with a forwardly projective curved face extending from within the forward line of the shell, forwardly and beyond said line and closing about half of the mouth opening, a draft chain provided with a link passing through said plate, said link having loops at its opposite ends and being curved from loop to loop for protecting a fish line against strains, a trailer link within the shell, loops on its ends for respective connections with the rear loop of the first described link, and a fish hook at the tail of said lure.

3. A fishing lure comprising a tubular body tapered from the mouth to the tail and open at both ends, a semi-spherical baffle plate projecting from the mouth and partially closing the same, a draft-chain extending through the baffle plate, means for attaching a fish line to the forward link of said chain, and means for attaching a fish hook to the rear link of said chain.

HIRAM L. ROSSELLE.